US012604295B2

(12) United States Patent
Isson et al.

(10) Patent No.: US 12,604,295 B2
(45) Date of Patent: Apr. 14, 2026

(54) INCREASING RELIABILITY OF THE GEOLOCATION OF A TERMINAL BASED ON ONE OR MORE IDENTIFIERS OF NEIGHBOURING TRANSMITTING DEVICES

(71) Applicant: UNABIZ, Labege (FR)

(72) Inventors: Olivier Isson, Lauzerville (FR);
Renaud Marty, Ramonville Saint Agne (FR); Juan Carlos Zuniga, Montreal (CA); Julien Boite, Lanta (FR)

(73) Assignee: UNABIZ, Labege (FR)

( * ) Notice: Subject to any disclaimer, the term of this patent is extended or adjusted under 35 U.S.C. 154(b) by 290 days.

(21) Appl. No.: 18/575,065

(22) PCT Filed: Jun. 21, 2022

(86) PCT No.: PCT/EP2022/066804
§ 371 (c)(1),
(2) Date: Dec. 28, 2023

(87) PCT Pub. No.: WO2023/274778
PCT Pub. Date: Jan. 5, 2023

(65) Prior Publication Data
US 2025/0024407 A1    Jan. 16, 2025

(30) Foreign Application Priority Data
Jun. 29, 2021    (FR) ...................................... 2106964

(51) Int. Cl.
*H04W 64/00*          (2009.01)
*G01S 5/02*           (2010.01)
(52) U.S. Cl.
CPC ........... *H04W 64/00* (2013.01); *G01S 5/0244* (2020.05); *G01S 5/02529* (2020.05)

(58) Field of Classification Search
CPC .. H04W 64/00; G01S 5/0244; G01S 5/02529; G01S 5/0252; G06F 16/29
(Continued)

(56) References Cited

U.S. PATENT DOCUMENTS

2004/0203885 A1    10/2004  Quaid
2004/0203912 A1*   10/2004  Budka ................... H04W 64/00
                                                          455/456.1
(Continued)

OTHER PUBLICATIONS

International Search Report w/English translation for PCT/EP2022/066804 mailed Oct. 20, 2022, 5 pages.
(Continued)

*Primary Examiner* — Don N Vo
(74) *Attorney, Agent, or Firm* — NIXON & VANDERHYE

(57)          ABSTRACT

This relates to a method for geolocating a terminal of a wireless communication system. The terminal detects one or more identifiers of neighbouring transmitting devices. The terminal sends the detected identifies in a message to an access network. A server of the access network determines, for each identifier, a score representative of the reliability of the identifier relative to a geolocation database. For this purpose, the server uses an identifier reliability database that stores identifiers of transmitting devices and their respective scores. The geolocation database stores identifiers of transmitting devices and their respective geographical positions. The server selects the identifiers having the best scores to geolocate the terminal using the geolocation database.

21 Claims, 8 Drawing Sheets

(58) Field of Classification Search
USPC ..................................................... 455/456.5
See application file for complete search history.

(56) References Cited

U.S. PATENT DOCUMENTS

| 2011/0250903 | A1 | 10/2011 | Huang et al. | |
| 2013/0143585 | A1* | 6/2013 | Kenington | ......... G01S 5/02521 |
| | | | | 455/456.1 |
| 2013/0176960 | A1* | 7/2013 | Franklin | ............... H04W 72/02 |
| | | | | 370/329 |
| 2014/0155086 | A1 | 6/2014 | Bhatia | |
| 2021/0247481 | A1* | 8/2021 | Isson | ................... G01S 5/02521 |
| 2022/0221551 | A1* | 7/2022 | Larignon | ................. G01S 5/02 |

OTHER PUBLICATIONS

Written Opinion of the ISA for PCT/EP2022/066804 mailed Oct. 20, 2022, 6 pages.
International Preliminary Report on Patentability w/Amended Sheets for PCT/EP2022/066804 mailed Jan. 10, 2023, 32 pages.

* cited by examiner

33

| Index | C1 | C2 | ... | CK | ID | Score |
|-------|----|----|-----|----|----|-------|
| 1 | | | | | | |
| 2 | | | | | | |
| ⋮ | | | | | | |
| N | | | | | | |

Fig. 6

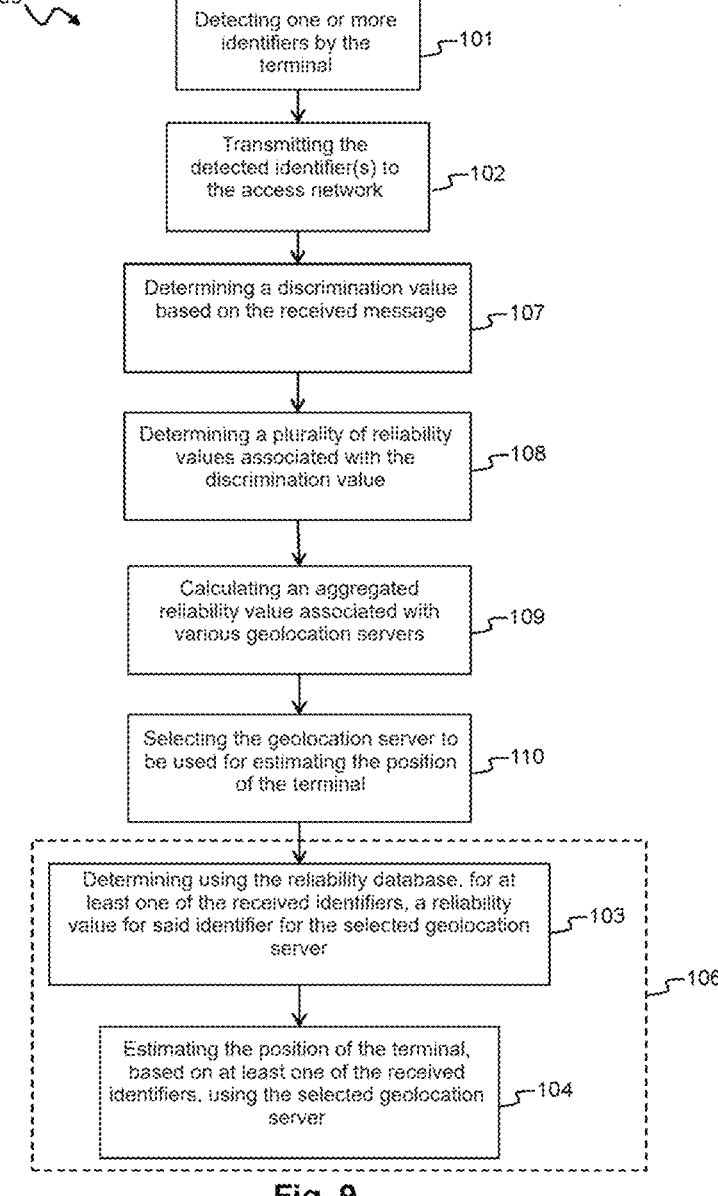

100

Detecting one or more identifiers by the terminal — 101

Transmitting the detected identifier(s) to the access network — 102

Determining a discrimination value based on the received message — 107

Determining a plurality of reliability values associated with the discrimination value — 108

Calculating an aggregated reliability value associated with various geolocation servers — 109

Selecting the geolocation server to be used for estimating the position of the terminal — 110

Determining using the reliability database, for at least one of the received identifiers, a reliability value for said identifier for the selected geolocation server — 103

Estimating the position of the terminal, based on at least one of the received identifiers, using the selected geolocation server — 104

INCREASING RELIABILITY OF THE GEOLOCATION OF A TERMINAL BASED ON ONE OR MORE IDENTIFIERS OF NEIGHBOURING TRANSMITTING DEVICES

CROSS-REFERENCE TO RELATED APPLICATIONS

This application is the U.S. national phase of International Application No. PCT/EP2022/066804 filed Jun. 21, 2022, which designated the U.S. and claims priority to FR 2106964 filed Jun. 29, 2021, the entire contents of each of which are hereby incorporated by reference.

FIELD OF THE INVENTION

The present invention belongs to the field of the geolocation of a terminal of a wireless communication system. The geolocation of the terminal is implemented based on one or more identifiers of neighbouring transmitting devices detected by the terminal and using a geolocation server including a database making the association between transmitting devices and their geographical position.

PRIOR ART

Currently, there are a plurality of geolocation systems based on a database making the association between an identifier of a transmitting device (for example a WiFi or Bluetooth access point, or a RFID tag) with the geographical position of the transmitting device.

In such a geolocation system, a terminal detects, for at least one transmitting device, an identifier of the transmitting device based on a message transmitted by the transmitting device, for example on a beacon signal. The terminal subsequently sends a query message to a geolocation server. The query message includes the identifier of the transmitting device. The geolocation server includes a geolocation database making the association between identifiers of transmitting devices and their respective geographical positions. The geolocation server can then determine the geographical position associated with said transmitting device, then send this information to the terminal in a response message. The geographical position of the transmitting device corresponds to an estimated geographical position of the terminal.

The geographical position of the terminal may possibly be refined depending on a power level with which the beacon signal is received by the terminal. It is also possible to estimate the geographical position of the terminal depending on the geographical position of a plurality of different transmitting devices the terminal of which has received the beacon signal at a given moment.

The geographical position of a transmitting device may, however, change over time. When this is the case, the geolocation database must be updated so that the association between the identifier and the geographical position of the transmitting device remains correct. If the association between the identifier and the geographical position of the transmitting device is not correct in the geolocation database, then an estimation of the geographical position of the terminal based on said identifier is distorted.

The campaigns for updating a geolocation database are particularly expensive, and the frequency at which they are carried out is sometimes insufficient to guarantee a satisfactory reliability in the geolocation of a terminal. Furthermore, these update campaigns are rarely exhaustive.

It can also happen that two different transmitting devices located at different geographical positions share the same identifier. The geolocation database may make the association between said identifier and only one of said two geographical positions. This association will be correct in some use cases, particularly for the terminals that are located within range of the transmitting device the geographical position of which is that stored in the geolocation database. This association will on the other hand be incorrect in other use cases, particularly for the terminals that are located within the range of the other transmitting device the geographical position of which is not stored in the geolocation database. Depending on the case, an estimation of the geographical position of the terminal based on said identifier may be distorted.

A plurality of different geolocation databases are sometimes available for estimating the geographical position of a terminal (various databases managed by different service providers). However, currently there is no solution for determining, on a case-by-case basis, which database should be used for obtaining the best estimation of the position of the terminal.

Therefore, a satisfactory solution should be found to increase reliability of the geolocation of a terminal based on one or more identifiers of neighbouring transmitting devices detected by the terminal.

Disclosure of the Invention

The object of the present invention is to remedy all or some of the drawbacks of the prior art, particularly those disclosed hereinabove, by proposing a solution for increasing reliability of the geolocation of a terminal based on one or more identifiers of neighbouring transmitting devices.

To this end, and according to a first aspect, the present invention proposes a method for geolocating a terminal of a wireless communication system. The terminal is adapted to exchange messages with an access network of said wireless communication system according to a first wireless communication protocol. The method includes:

detecting (101), by the terminal, for at least one transmitting device, an identifier of said transmitting device based on a message transmitted by said transmitting device according to a second wireless communication protocol, transmitting (102), by the terminal, to the access network, according to the first wireless communication protocol, at least one message including one or more detected identifiers, determining (106), by the access network, a geographical position of the terminal by transmitting a request comprising at least one of the received identifiers to a geolocation server storing a geolocation database including a list of identifiers of transmitting devices and the respective geographical positions of said transmitting devices, said request being defined using a database, known as "identifier reliability database", making it possible to associate with any identifier at least one value representative of the reliability of said identifier for said geolocation server, the identifier reliability database being stored by one or more servers different from the geolocation server.

It should be noted that, in the present application, the expression "geographical position" of an object (terminal or transmitting device) may correspond, broadly, to position information representative of the exact geographical position of said object. Thus, it may directly concern coordinates (longitude, latitude and possibly altitude) of a geographical position, but it may also concern contextual information making it possible to estimate the exact geographical position of the object (such as for example a postal address, a store name, a district, region or country name, etc.).

The invention is based on the fact that a database different from the geolocation database gives information about a reliability value associated with each of the identifiers detected by the terminal.

In the identifier reliability database, a reliability value is associated with an identifier and with a geolocation server. The reliability value is representative of the confidence that can be given to this identifier to be able to accurately geolocate the terminal using this identifier with said geolocation server. The identifier reliability database may be constructed to give information about the reliability of the identifiers relative to a single geolocation server, or relative to a plurality of different geolocation servers.

However, it should be noted that a reliability value of an identifier may also be weighted depending on additional criteria, such as for example a service cost of the associated geolocation server.

Thus, this may particularly make it possible to filter the identifiers to be taken into account in the estimation of the geographical position of the terminal using the geolocation database, depending on the reliability values of the identifiers. For example, a low reliability value is attributed in the reliability database to the identifiers for which the associated geographical position in the geolocation database is considered erroneous; the identifiers having too low a reliability value will not be taken into account for estimating the geographical position of the terminal.

Alternatively or additionally, and when a plurality of different geolocation servers are considered, the reliability values may make it possible to select the geolocation server that seems the most reliable for geolocating the terminal from a plurality of geolocation servers. This selection may even take place by using reliability values associated with identifiers that are different from the identifiers detected by the terminal. Thus, the term "any identifier" must be understood as being able to correspond to an identifier within the set of the identifiers detected and transmitted by the terminal that it is sought to geolocate, as well as to an identifier that is not part of this set of identifiers detected and transmitted by the terminal.

Thus, the reliability database is used for determining the geolocation server to be used and/or to select the identifiers that should be included in the request (that is to say to define the recipient and/or the content of the request).

In particular implementations, the invention may further include one or more of the following features, taken in isolation or according to any technically possible combinations.

In particular implementations, determining the geographical position of the terminal includes:

determining, by the access network, using the identifier reliability database, for at least one of the received identifiers, a reliability value for said identifier, when said at least one of the received identifiers has a satisfactory reliability value, estimating a geographical position of the terminal based on said identifier with the geolocation server.

In particular implementations, the reliability value of each identifier from the received identifiers is compared with a threshold value in order to determine whether or not the identifier must be used for estimating the geographical position of the terminal using the geolocation server.

In particular implementations, a maximum predetermined number of identifiers from the received identifiers having the best reliability values are used for estimating the geographical position of the terminal using the geolocation server.

In particular implementations, the method further includes, when none of the received identifiers has a satisfactory reliability value, estimating an approximate geographical position of the terminal without using the geolocation server.

In particular implementations, the identifier reliability database includes, for said at least one of the received identifiers, an approximate geographical position of the transmitting device carrying said identifier, said approximate geographical position having been previously determined without using the geolocation server. The estimation of the approximate geographical position of the terminal is then carried out depending on the approximate geographical position associated with said identifier.

In particular implementations, said at least one of the received identifiers is associated, in the identifier reliability database, with a plurality of reliability values each associated with a different value of discrimination information (the term "discrimination key" could also be used instead of the term "discrimination information", while having the same meaning).

In particular implementations, a value of the discrimination information is determined by the access network based on said at least one message received from the terminal, and the geolocation method includes, for said at least one of the received identifiers, obtaining a reliability value to be taken into account for estimating the geographical position of the terminal based on said value of the discrimination information.

In particular implementations, the discrimination information makes it possible to identify a geolocation server, and the geolocation method includes selecting the geolocation server to be used for estimating the geographical position of the terminal depending on the various reliability values of said at least one of the received identifiers.

In particular implementations, any identifier may be associated, in the identifier reliability database, with a plurality of reliability values each associated with a different value of discrimination information, and the geolocation method includes:

determining, by the access network, a value of the discrimination information based on said at least one message received from the terminal, determining a plurality of reliability values associated with said discrimination information value in the identifier reliability database, calculating an aggregated reliability value, for each one of a plurality of geolocation servers, based on the reliability values thus determined, selecting the geolocation server to be used for estimating the geographical position of the terminal depending on the calculated aggregated values.

In particular implementations, the first wireless communication protocol is a wireless wide area network or a low power wireless wide area network communication protocol, and the second wireless communication protocol is a wireless local area network communication protocol, a wireless personal area network communication protocol or a near field communication protocol.

According to a second aspect, the present invention relates to a method for updating an identifier reliability database such as defined in any one of the preceding implementations. The method includes:

detecting, by a terminal, for at least one transmitting device, an identifier of said transmitting device based on a message transmitted by said transmitting device according to the second wireless communication protocol, transmitting, by the terminal, to the access network, according to the first wireless communication protocol, a message including said identifier, estimating a geographical position of the terminal using a geolocation server (50) based on said identifier, determining, without using the geolocation server, an approximate geographical position of the terminal, checking the consistency, between the approximate geographical position of the terminal and the estimated geographical position of the terminal using the geolocation server (50), updating the identifier reliability database for said identifier depending on the result of the consistency check.

In particular implementations, the invention may further include one or more of the following features, taken in isolation or according to any technically possible combinations.

In particular implementations, the consistency check includes calculating a distance between the approximate geographical position of the terminal and the geographical position associated with said identifier in the geolocation database.

In particular implementations, the update includes calculating a new reliability value depending on a distance between the approximate geographical position of the terminal and the geographical position associated with said identifier in the geolocation database.

In particular implementations, the new reliability value is further calculated depending on a reliability value previously attributed to said identifier in the identifier reliability database.

In particular implementations, the identifier reliability database includes, for said identifier, a last update date of the reliability value, and the new reliability value is further calculated depending on the current date and on the last update date of the reliability value of said identifier.

In particular implementations, the update method further includes determining an approximate geographical position of the transmitting device carrying said identifier, without using the geolocation server, and associating said approximate geographical position of the transmitting device with said identifier in the identifier reliability database.

According to a third aspect, the present invention relates to a server of an access network of a wireless communication system. Said system includes at least one terminal adapted to exchange messages with the access network according to a first wireless communication protocol and to receive a message transmitted by a transmitting device according to a second wireless communication protocol. Said server is configured to:

receive from the terminal at least one message including at least one identifier of a transmitting device detected by said terminal, determine a geographical position of the terminal by transmitting a request comprising at least one of the received identifiers to a geolocation server storing a geolocation database including a list of identifiers of transmitting devices and the respective geographical positions of said transmitting devices, said request being defined using a database, known as "identifier reliability database", making it possible to associate with any identifier at least one value representative of the reliability of said identifier for said geolocation server, the identifier reliability database being stored by one or more servers different from the geolocation server.

The server is configured to implement any one of the implementations described above of the geolocation method, and/or any one of the implementations described above of the method for updating the identifier reliability database. In particular, the server may further include one or more of the following features, taken in isolation or according to any possible technical combinations.

In particular embodiments, the server is configured to:

determine, for at least one of the received identifiers, a reliability value using the identifier reliability database, when at least one of the received identifiers has a satisfactory reliability value, estimate a geographical position of the terminal based on said identifier with the geolocation server.

In particular embodiments, the server is further configured, when none of the received identifiers has a satisfactory reliability value, to estimate an approximate geographical position of the terminal without using the geolocation server.

In particular embodiments, the server is further configured to estimate the approximate geographical position of the terminal based on, for at least one of the received identifiers, an approximate geographical position of the transmitting device carrying said identifier, said approximate geographical position of the transmitting device having been previously determined by the server without using the geolocation server and stored in the identifier reliability database.

In particular embodiments, said at least one of the received identifiers is associated, in the identifier reliability database, with a plurality of reliability values each associated with a different value of discrimination information making it possible to identify a geolocation server, and said server is further configured to select, depending on the various reliability values associated with said identifier, the geolocation server to be used for estimating the geographical position of the terminal.

In particular embodiments, any identifier may be associated, in the identifier reliability database, with a plurality of reliability values each associated with a different value of discrimination information, and the server is configured to:

determine a value of the discrimination information based on said at least one message received from the terminal, determine a plurality of reliability values associated with said discrimination information value in the identifier reliability database, calculate an aggregated reliability value, for each one of a plurality of geolocation servers, based on the reliability values thus determined, select the geolocation server to be used for estimating the geographical position of the terminal depending on the calculated aggregated values.

In particular embodiments, the server is further configured to:

determine an approximate geographical position of the terminal without using the geolocation server, check a consistency between the approximate geographical position of the terminal and the estimated geographical position of the terminal using the geolocation server, update the identifier reliability database for at least one of the received identifiers depending on the result of the consistency check.

In particular embodiments, the server is further configured to calculate, for at least one of the received identifiers, a new reliability value depending on a distance between the approximate geographical position of the terminal and the geographical position associated with said identifier in the geolocation database.

According to a fourth aspect, the present invention relates to an access network including an access network server according to any one of the preceding embodiments.

In particular embodiments, said access network is a wireless wide area network or a wireless low power wide area network.

PRESENTATION OF THE FIGURES

The invention will be better understood upon reading the following description, given by way of a non-limiting example, and made with reference to FIGS. 1 to 6 that represent:

FIG. 1 a schematic representation of one example of embodiment of a wireless communication system used for geolocating a terminal using a geolocation server, FIG. 2 a schematic representation of one example of embodiment of a terminal, FIG. 3 a schematic representation of the main steps of a geolocation method according to the invention, FIG. 4 a schematic representation of the main steps of a particular implementation of the geolocation method, FIG. 5 an illustration of one example of implementation of the geolocation method, FIG. 6 an example of possible structure for an identifier reliability database, FIG. 7 a schematic representation of the main steps of a method for updating an identifier reliability database, FIG. 8 a schematic representation of the main steps of a particular implementation of the geolocation method, FIG. 9 a schematic representation of the main steps of a particular implementation of the geolocation method.

In these figures, identical references from one figure to another refer to identical or similar elements. For clarity, the represented elements are not necessarily plotted to the same scale, unless stated otherwise.

DETAILED DESCRIPTION OF AN EMBODIMENT OF THE INVENTION

FIG. 1 schematically represents a wireless communication system 10 including at least one terminal 20 and an access network 30 including a plurality of base stations 31.

The terminal 20 is adapted to transmit messages on an uplink to the access network 30. Each base station 31 is adapted to receive messages from the terminal 20 when said terminal is located within its range. Conventionally, a message transmitted by the terminal 20 includes an identifier of the terminal 20. Each message received by a base station is for example transmitted to a server 32 of the access network 30, possibly accompanied with other information such as an identifier of the base station 31 that received it, the reception power level of said received message, the time of arrival of said message, the frequency at which the message has been received, etc. The server 32 processes for example all of the messages received from the various base stations 31.

The wireless communication system 10 may be one way, that is to say that it only makes it possible to exchange messages on the uplink of the terminal 20 towards the access network 30. However, nothing excludes, according to other examples, making two-way exchanges possible. If necessary, the access network 30 is also adapted to transmit, by means of base stations 31, messages on a downlink to the terminal 20, which is adapted to receive them.

The exchanges of messages on the uplink to the access network 30 use a first wireless communication protocol.

In particular embodiments, the first wireless communication protocol is a Wireless Wide Area Network (WWAN) communication protocol. For example, the first wireless communication protocol is a standardised communication protocol of the Universal Mobile Telecommunications System (UMTS), Long Term Evolution (LTE), LTE-Advanced Pro, 5G, etc., type.

Alternatively, the first wireless communication protocol is a Low Power Wide Area Network (LPWAN) communication protocol. Such a wireless communication system is a long-range access network (greater than one kilometre, or even greater than several tens of kilometres), with low power consumption (for example, a power consumption during transmission or reception of a message of less than 100 mW, or even less than 50 mW, or even less than 25 mW), and the speeds of which are generally below 1 Mbps. From the examples of LPWAN networks, Sigfox, LoRaWAN, Ingenu, Amazon Sidewalk, Helium, etc., can particularly be cited. Such wireless communication systems are particularly adapted to applications of the IoT or M2M type.

In a communication system of the IoT or M2M type, the data exchanges are mainly one way, in this instance on an uplink of the terminals 20 to the access network 30 of the wireless communication system 10. In order to minimise the risks of losing a message transmitted by a terminal 20, the access network is often produced such that a given geographical area is simultaneously covered by a plurality of base stations 31, in such a way that a message transmitted by a transmitting device 20 can be received by a plurality of base stations 31.

In the remainder of the description, it is considered by way of non-limiting example that the first wireless communication protocol is an ultra-narrow band and wireless low power wide area network communication protocol. The term "Ultra Narrow Band" (UNB) is understood herein to mean that the instantaneous frequency spectrum of the radio electric signals transmitted by the terminals has a frequency bandwidth of less than two kilohertz, or even of less than one kilohertz.

As illustrated in FIG. 1, the terminal 20 is also adapted to receive messages transmitted by at least one transmitting device 40, which is located within the vicinity of said terminal 20. The messages transmitted by the transmitting device 40 use a second wireless communication protocol, different from the first wireless communication protocol. It should be noted that the transmitting device 40 may be completely independent of the wireless communication system 10, and there is no need to support the first wireless communication protocol.

In particular embodiments, the second wireless communication protocol has a range shorter than the range of the first wireless communication protocol. In such a case, the geographical position of the transmitting device 40, within the range in which the terminal 20 is located, provides more accurate information about the geographical position of the terminal 20 than, for example, the geographical position of a base station 31 that receives a message transmitted by the terminal 20.

However, it should be noted that it is also possible, according to other examples, to have a second wireless communication protocol the range of which is not shorter than that of the first wireless communication protocol.

The second wireless communication protocol is for example a Wireless Local Area Network (WLAN) communication protocol, for example of the WiFi type (IEEE 802.11 standards), etc., or also a Wireless Personal Area Network (WPAN) communication protocol, for example of the Bluetooth or Bluetooth Low Energy (BLE) type, etc. According to yet another example, the second wireless communication protocol may be a short-range communication protocol based for example on the Near Field Communication (NFC) technology or on the Radio Frequency Identification (RFID) technology.

A geolocation server 50 includes a database, known as "geolocation database", including a table storing identifiers of transmitting devices 40. Each identifier of transmitting device 40 is associated in the table with at least one position information representative of the geographical position of the transmitting device 40.

An identifier of a transmitting device 40 corresponds for example to a Media Access Control (MAC) address of the transmitting device 40. However, other parameters could act as an identifier for a transmitting device 40, such as for example a Service Set Identifier (SSID) or a Base Service Set Identifier (BSSID) of a WiFi access point, an identifier of a Bluetooth or BLE access point, an identifier of an RFID tag, etc.

The position information may be directly the coordinates (longitude, latitude and possibly altitude) of a geographical position of the transmitting device 40. However, the position information may also be contextual information making it possible to estimate the geographical position of the transmitting device 40, such as for example a postal address, a store name, a district, region or country name, etc.

The geolocation server 50 is for example connected to the server 32 of the access network 30 by an Internet connection.

As illustrated in FIG. 1, it is possible that a plurality of geolocation servers 50 are available. These various geolocation servers may for example be operated by various providers of a geolocation service.

FIG. 2 schematically represents one example of embodiment of a terminal 20.

As illustrated by FIG. 2, the terminal 20 includes a first communication module 21 adapted to exchange messages with the base stations 31 according to the first wireless communication protocol. The first communication module 21 is for example in the form of a radio electric circuit including equipment (antenna, amplifier, local oscillator, mixer, analogue filter, etc.).

The terminal 20 also includes a second communication module 22 adapted to receive messages transmitted by the transmitting device of interest 40, according to the second wireless communication protocol. The second communication module 22 is for example in the form of an electric radio circuit including equipment (antenna, amplifier, local oscillator, mixer, analogue filter, etc.).

Furthermore, the terminal 20 also includes a processing circuit 23, connected to the first communication module 21 and to the second communication module 22. The processing circuit 23 includes for example one or more processors and storage means (magnetic hard drive, electronic memory, optical disc, etc.) wherein a computer program product is stored, in the form of a set of program code instructions to be executed in order to implement the steps of a method for geolocating the terminal (see hereinafter).

The server 32 of the access network 30 also includes one or more processors and storage means wherein a computer program product is stored, in the form of a set of program code instructions to be executed in order to implement all or some of the steps of a method for geolocating the terminal and/or a method for updating an identifier reliability database (see hereinafter).

FIG. 3 schematically represents the main steps of a method 100 according to the invention for geolocating a terminal 20.

The method 100 includes a step of detecting 101, by the terminal 20, for at least one transmitting device 40, an identifier of the transmitting device 40 based on a message transmitted by the transmitting device 40 according to the second wireless communication protocol.

The method 100 subsequently includes a step of transmitting 102, by the terminal 20, to the access network 30, and according to the first wireless communication protocol, at least one message including the identifier(s) detected in step 101. It should be noted that a detected identifier can be transmitted in a single message or in a plurality of messages (each message then including a portion of said identifier). The same message may possibly contain a plurality of identifiers.

The method 100 subsequently includes a step of determining 106, by the access network 30, a geographical position of the terminal 20, based on at least one of the received identifiers, and using a database, known as "identifier reliability database" and a geolocation server 50. This determination step 106 particularly includes transmitting a request comprising at least one of the received identifiers to the geolocation server 50.

The identifier reliability database makes it possible to associate a reliability value with an identifier. The reliability value is representative of the confidence that can be given to this identifier to be able to accurately geolocate the terminal using this identifier with the geolocation server.

It should be noted that the identifier reliability database may be constructed to give information about the reliability of the identifiers relative to a single geolocation server, or relative to a plurality of different geolocation servers. When there are a plurality of different geolocation servers, each reliability value is further associated with a particular geolocation server.

The identifier reliability database may make it possible to filter the identifiers to be taken into account in the estimation of the geographical position of the terminal using the geolocation server 50, depending on the reliability values of the received identifiers. For example, a low reliability value is attributed in the reliability database to the identifiers for which the associated geographical position in the geolocation database is considered erroneous; the identifiers having too low a reliability value will not be taken into account for estimating the geographical position of the terminal.

Alternatively or additionally, and when a plurality of different geolocation servers are considered, the reliability values may make it possible to select the geolocation server that seems the most reliable for geolocating the terminal from a plurality of geolocation servers.

FIG. 4 shows by way of example a particular implementation of the geolocation method 100 described hereinabove with reference to FIG. 3. The particular implementation described in FIG. 4 makes it possible to filter the identifiers to be taken into account in the estimation of the geographical position of the terminal using the geolocation server 50.

As illustrated in FIG. 4, in this particular implementation, the method 100 repeats steps 101 and 102 described above with reference to FIG. 3.

The method 100 subsequently includes a step of determining 103, for each received identifier, a reliability value. The reliability value is representative of a confidence given to the identifier for geolocating the terminal 20 with the geolocation server 50. For each identifier, the reliability value is determined using a database, known as "identifier reliability database". The identifier reliability database is stored by one or more servers different from the geolocation server 50. In particular, the identifier reliability database may be stored by the server 32 of the access network 30. However, the identifier reliability database could also be shared between a plurality of servers belonging to the access network 30. According to yet another variant, the identifier reliability database could be stored by one or more third-party servers connected to the access network 30 but managed by an operator different from the operator who manages the access network 30.

The identifier reliability database makes it possible to associate a reliability value with an identifier. The reliability value corresponds for example to a value (a score) between zero and one. The closer the reliability value of an identifier is to one, the more it can be considered that the geographical position of the transmitting device associated in the geolocation database with said identifier is reliable. Conversely, the closer the reliability value of an identifier is to zero, the more likely it is that the geographical position of the transmitting device associated in the geolocation database with said identifier is incorrect.

However, nothing would prevent a reliability value from being defined according to a percentage (between zero and one hundred). Also, nothing would prevent a low reliability value from being attributed to a reliable identifier (instead of attributing a high reliability value to a reliable identifier).

According to another example, the identifier reliability database corresponds to a list of identifiers that have been considered sufficiently reliable. If an identifier is not in the identifier reliability database, then it can be attributed a reliability value equal to zero. If an identifier is in the identifier reliability database, then it can be attributed a reliability value equal to one.

According to yet another example, the identifier reliability database corresponds to a list of identifiers that have not been considered sufficiently reliable. If an identifier is not in the identifier reliability database, then it can be attributed a reliability value equal to one. If an identifier is in the identifier reliability database, then it can be attributed a reliability value equal to zero.

Thus, there are a large number of different methods for attributing a reliability value to an identifier and for storing this information in the identifier reliability database. The choice of one particular method from others does not, however, represent only one variant of the invention.

When at least one of the received identifiers has a satisfactory reliability value (that is to say for example a reliability value higher than a predetermined threshold value), the method 100 includes a step of estimating 104 a geographical position of the terminal 20, depending on the reliability values thus determined, and using the geolocation server 50.

In particular implementations, the reliability value of each received identifier is compared with a threshold value to determine whether or not the identifier must be used for estimating 104 the geographical position of the terminal 20 using the geolocation server 50.

In particular implementations, a maximum predetermined number of identifiers having the highest reliability values are used for estimating 104 the geographical position of the terminal 20 using the geolocation server 50.

Such provisions make it possible to filter the identifiers to be taken into account in the estimation of the geographical position of the terminal using the geolocation database (that is to say to filter the identifiers to be included in the request to be transmitted to the geolocation server 50), depending on the reliability values of the identifiers. For example, if a low reliability value is attributed in the reliability database to the identifiers for which the associated geographical position in the geolocation database is considered erroneous, it then becomes possible to favour the identifiers that have a high reliability value.

In the example considered, steps 103 and 104 are implemented by the server 32 of the access network 30. However, it should be noted that, in one variant, nothing would prevent these steps from being implemented by a third-party server, for example a third-party server that hosts the identifier reliability database. However, this is the case where the server(s) that store the identifier reliability database are different from the geolocation server 50. This makes it possible for the operator of the identifier reliability database to maintain their database without depending on the operator of the geolocation server 50. Furthermore, these servers may include information that is not known by the geolocation server 50 (this may concern for example private information known only by the access network 30 and that must not be communicated to the geolocation server 50).

According to a first example, the server 32 of the access network 30 sends to the geolocation server 50 the identifier(s) considered sufficiently reliable, and the geolocation server 50 estimates the position of the terminal 20 based on the geographical positions associated with the various identifiers in the geolocation database. According to a second example, the geolocation server 50 simply returns the geographical position associated with each identifier in the geolocation database, and it is the server 32 that estimates the position of the terminal 20 based on the geographical positions associated with the various identifiers.

In the example considered and illustrated in FIG. 4, when none of the received identifiers has a satisfactory reliability value, the method 100 includes a step of estimating 105 an approximate geographical position of the terminal 20 without using the geolocation server 50. This step is for example implemented by the server 32 of the access network 30. However, it should be noted that, in one variant, this step could also be implemented by a third-party server, for example a third-party server that hosts the identifier reliability database. It should also be noted that this step is optional (it would be possible to consider that no position of the terminal 20 may be determined reliably when none of the received identifiers has a satisfactory reliability value).

The approximate geographical position of the terminal 20 may correspond to coordinates (longitude, latitude and possibly altitude) of an estimated position of the terminal 20, with possibly an indication of the accuracy of this estimated position. However, this may also be contextual information making it possible to estimate the position of the terminal 20, such as for example a postal address, a store name, a district, region or country name, etc. This contextual information may in particular be determined directly based on one or more parameters contained in the message transmitted by the terminal 20 and/or based on the information available within the access network associated with the terminal 20 that transmitted the message and derived from said message. By way of example, it is possible to determine in which region or in which country the terminal 20 is located based on an identifier of the terminal 20 if the access network 30 has the knowledge that this terminal belongs to a customer company that only operates in a region or in a particular country.

The access network 30 is for example configured to estimate an approximate geographical position of the terminal 20 depending on messages received from said terminal 20. In particular implementations, the approximate geographical position is estimated based on the received message including the identifier of the transmitting device 40. However, nothing excludes, according to other examples, estimating the approximate geographical position of the terminal 20 based on other messages previously transmitted by the terminal 20.

Various methods for estimating the approximate geographical position of the terminal 20 may be implemented. For example, the access network 30 may estimate the approximate geographical position of the terminal 20 as being the geographical position of a base station 31 that has received a message transmitted by the terminal 20. If a plurality of base stations 31 can receive a message transmitted by the terminal 20, it is possible to estimate the approximate geographical position of the terminal 20 depending on geographical positions of all of the base stations 31 that have received the message transmitted by the terminal 20 (for example by defining a barycentre of these geographical positions).

According to another example, the access network 30 may estimate the distances that separate the terminal 20 of one or more base stations 31 by calculating the propagation time of a message transmitted by the terminal 20 to base stations 31 based on Time of Arrival (TOA) measurements or Time Difference of Arrival (TDOA) measurements of this message at various base stations 31. Subsequently, it is then possible to estimate the position of the terminal 20 by multilateration if the geographical positions of the base stations 31 are known.

According to another example, it is possible to estimate the position of the terminal 20 by multilateration by determining the distances that separate the terminal 20 of a plurality of base stations 31 based on an RSSI measurement for each base station 31 for a message transmitted by the terminal 20 to the access network 30.

According to another example, the method for estimating an approximate geographical position of the terminal 20 by the access network 30 may be based on Machine Learning techniques that associate a radio fingerprint with a geographical position of the geographical area considered. Such a method is based on the hypothesis that a receiving power level by a base station 31 for a message transmitted by the terminal 20 located at a given geographical position is stable over time. In practical terms, this concerns constructing during a first calibration phase, a database that associates with known geographical positions a "radio signature" corresponding to all of the RSSI measurements obtained for a terminal 20 at the geographical position considered for a set of base stations 31. Subsequently, during a search phase, a radio signature observed for the terminal 20 of which it is sought to estimate the approximate geographical position is compared to all of the radio signatures of the database in order to estimate the approximate geographical position of the terminal 20 based on the geographical position(s) corresponding to the radio signature(s) the most similar to the radio signature of the terminal 20.

In particular implementations, the estimation of the approximate geographical position of the terminal 20 is carried out by the access network 30 without explicit information contributing to this estimation being sent by the terminal in a message to the access network (in other words, the terminal does not transmit to the access network messages the binary data of which include information making it possible to estimate the geographical position of the terminal). Such provisions make it possible to limit the amount of data exchanged between the terminal and the access network for geolocating the terminal 20.

In particular implementations, an approximate geographical position may be attributed to a transmitting device 40 in the identifier reliability database. This approximate geographical position of the transmitting device 40 may have been previously determined without using the geolocation server 50. This approximate geographical position of the transmitting device 40 may correspond, for example, to an approximate geographical position, estimated by the access network 30, of a terminal 20 that previously sent a message including the identifier of said transmitting device 40. The approximate geographical position may also be estimated by the access network 30 based on the estimated positions of a plurality of terminals 20 having previously sent a message including the identifier of said transmitting device 40. Thus, it is possible to establish a time smoothing of the estimated positions of the terminals having detected and transmitted this identifier (median, weighted average, exponential smoothing, etc.).

It should be noted that for legal issues, it is not possible to store in the identifier reliability database a position of a transmitting device 40 provided by the geolocation database. Nevertheless, it is advantageous to store an approximate geographical position of a transmitting device 40 in the identifier reliability database, in order to subsequently help to geolocate a terminal 20 that detects this identifier, in the case where the position associated with this identifier in the geolocation database is not reliable.

Thus, in particular implementations, the identifier reliability database includes, for at least one of the received identifiers, an approximate geographical position of the transmitting device 40 carrying said identifier (said approximate geographical position having been previously determined without using the geolocation server 50), and the approximate geographical position of the terminal 20 is estimated in step 105 depending on the approximate geographical position associated with said identifier.

FIG. 5 illustrates an example of implementation of the geolocation method 100 according to the invention.

In this example, it is considered that a terminal 20 detects (in step 101) three transmitting devices 40 respectively associated with the identifiers ID1, ID2, and ID3. Each identifier is detected on a beacon signal transmitted respectively by each transmitting device 40 according to the second wireless communication protocol.

The terminal 20 then transmits (in step 102) a message including the detected identifiers ID1, ID2, and ID3. This message is transmitted to the access network 30 according to the first wireless communication protocol.

In the example considered and illustrated in FIG. 5, a server 32 of the access network 30 determines (in step 103), for each received identifier, a reliability value in an identifier reliability database 33. In the example considered, the identifier reliability database 33 is stored by the server 32. This identifier reliability database 33 associates a score (Score1, Score2, Score3, etc.) with each identifier (ID1, ID2, ID3, etc.).

A geolocation server 50 different from the server 32 stores a geolocation database 51 making the association between identifiers (ID1, ID2, ID3, etc.) and the geographical position (pos1, pos2, pos3, etc.) respectively associated with each identifier.

In the example considered, the scores of the identifier reliability database correspond to values between zero and one, and the higher the value of a score associated with an identifier is, the more the reliability of the geographical position associated with said identifier in the geolocation database 51 is considered reliable.

It is considered, by way of example, that the score Score2 associated with the identifier ID2 has a low value, for example 0.2. This means that the position pos2 associated with the identifier ID2 in the geolocation database 51 is considered erroneous. It is also considered, by way of example, that the scores Score1 and Score3 are respectively equal to 0.8 and 0.9. This means that the positions pos1 and pos3 respectively associated with the identifiers ID1 and ID3 in the geolocation database 51 are considered correct.

By way of non-limiting example, it is considered that only the identifiers the reliability value of which is higher than or equal to 0.7 must be used for geolocating the terminal 20 using the geolocation database 51. Consequently, the server 32 sends a request only including the identifiers ID1 and ID3 to the geolocation server 50 to estimate the position of the terminal 20.

A geographical position of the terminal 20 (pos) is then estimated (in step 104), based on the identifiers ID1 and ID3 that have been selected depending on reliability values, and using the geolocation server 50. In the example illustrated in FIG. 5, the position pos is determined by the geolocation server 50. In one variant, the geolocation server 50 would be able to return the positions pos1 and pos3 respectively associated with the identifiers ID1 and ID3, and the server 32 would then be able to determine a geographical position of the terminal 20 based on the positions pos1 and pos3 (for example by calculating a barycentre of the positions pos1 and pos3).

The position of the terminal 20 estimated based on the positions pos1 and pos3 of the identifiers ID1 and ID3 is more reliable and more accurate than a position that would be determined by also taking into account the position pos2 of the identifier ID2 (since this position pos2 is incorrect).

The structure of the identifier reliability database 33 illustrated in FIG. 5 is fairly basic since it simply associates a reliability value with an identifier. However, it is possible to associate other information with each identifier stored in the identifier reliability database 33.

In particular, and as has already been mentioned above, it is possible to associate with each identifier an approximate geographical position of the transmitting device 40 carrying said identifier, said approximate geographical position having been previously determined without using the geolocation server 50.

Other information could be associated with an identifier in the identifier reliability database 33.

In particular implementations, an identifier may be associated, in the identifier reliability database 33, with a plurality of reliability values each associated with a different value of discrimination information.

The geolocation method 100 may then include additional steps of determining a value of the discrimination information for the terminal 20 based on the received message, and obtaining, for at least one of the received identifiers, a reliability value to be taken into account for estimating 104 the geographical position of the terminal 20. This concerns for example selecting a reliability value from the various reliability values available for said identifier (this selection is carried out depending on the value of the discrimination information determined). According to another example, the reliability value to be taken into account for an identifier may be obtained via a calculation based on a plurality of reliability values.

The discrimination information may correspond to information representative of a group of terminals to which the terminal 20 belongs (such as for example the name of the customer company to which the terminal 20 belongs, a type of equipment corresponding to the terminal 20, etc.).

The discrimination information may also correspond to a geographical area wherein the terminal 20 is located. It can happen that two transmitting devices 40 sharing the same identifier are located at two geographical positions very distant from one another, and that only one of the two geographical positions is associated with said identifier in the geolocation database 51. The identifier reliability database 33 may then associate a high reliability value with said identifier for a terminal 20 that is located in a geographical area that also comprises the transmitting device the position of which is stored in the geolocation database 51. On the other hand, the identifier reliability database 33 may associate a low reliability value with said identifier for a terminal 20 that is located in a geographical area that comprises the transmitting device the position of which is that which is not stored in the geolocation database 51. Using discrimination information may then make it possible to know whether or not the identifier in question must be used in the estimation 104 of the geographical position of the terminal 20.

The discrimination information may also correspond to information representative of at least one other identifier of a transmitting device 40 detected by the terminal 20. Indeed, transmitting devices 40 that are geographically close to one another are generally detected simultaneously by a terminal 20. This information may make it possible to select a reliability value to be taken into account for a given identifier: for example, if two transmitting devices share the same identifier, but if only one of these two transmitting devices has already been detected simultaneously with another transmitting device indicated in the message transmitted by the terminal 20, then it is possible to attribute to said identifier, in the reliability database 33, a first reliability value when the other identifier is also detected, and a second reliability value when the other identifier is not detected.

In particular implementations, the discrimination information makes it possible to identify a geolocation server 50 (for example via an Internet address of the server, a domain name, a name of the operator who manages the server, etc.). The geolocation method 100 may then include a step of selecting the geolocation server 50 to be used (from the various available geolocation servers) for estimating 104 the geographical position of the terminal 20. This selection is carried out depending on the various reliability values associated with at least one of the received identifiers. This selection makes it possible to define the recipient of the request that is transmitted to a geolocation server to estimate the position of the terminal.

Indeed, it can happen that the geographical position of a transmitting device the identifier of which is stored in a first geolocation server is incorrect, but that the geographical position of said transmitting device stored in a second geolocation server is correct. The identifier reliability database 33 may then associate a low reliability value with said identifier for the first geolocation database 51, and a high reliability value with said identifier for the second geolocation database 51. The discrimination information may then make it possible to know which of the two geolocation databases must preferably be used for estimating 104 the geographical position of the terminal 20.

Many other examples of discrimination information could be envisaged and determined based on the information explicitly contained in the message received from the terminal 20, or based on the metadata of the message known by the access network 30. The choice of one particular item of discrimination information is only one variant of the invention.

The discrimination information may also correspond to the combination of a plurality of information of different natures.

Various structures may be envisaged for storing the data in the identifier reliability database 33. The choice of a particular structure of the identifier reliability database 33 is only one variant of the invention.

FIG. 6 illustrates, by way of non-limiting example, another possible structure of the identifier reliability database 33.

Figure 1:
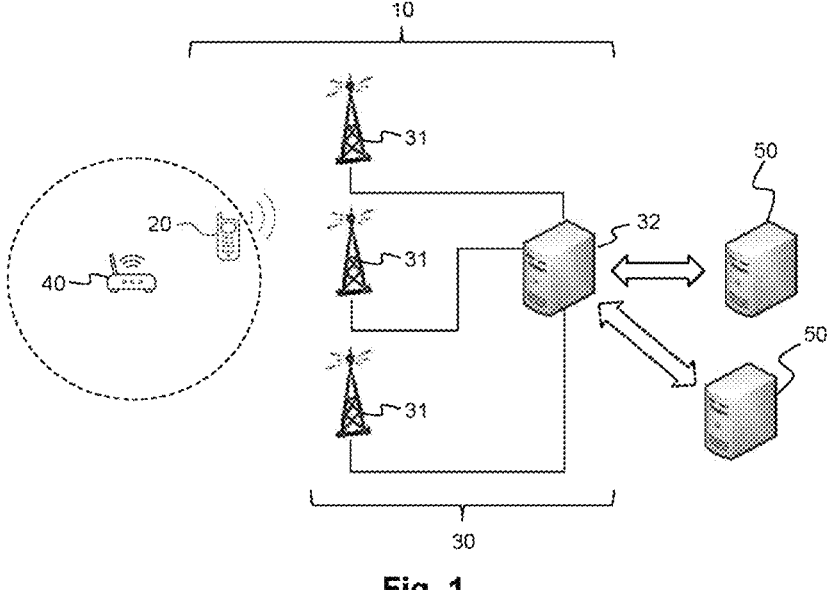
Figure 2:
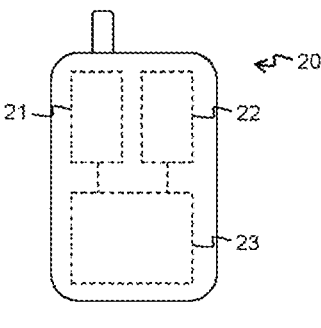

In the example considered and illustrated in FIG. 6, each line contains an identifier ID of a transmitting device 40 (or possibly a tuple of identifiers) that has already been given as information in the past in at least one previously received message coming from a terminal 20 of the communication system 10. A plurality of information relating to said message are stored in association with said identifier (or tuple of identifiers). For example, the information C1, C2, . . . , CK corresponds to features relating to the terminal 20 determined by the access network 30 based on the received message. This may particularly concern explicit data contained in the message or metadata associated with the message or with the terminal 20 having transmitted the message (for example an identifier of the terminal, the name of the customer company to which the terminal belongs, a particular type of terminal, a particular service associated with the terminal, information about the geographical position of the terminal determined by the access network, etc.). Certain information C1, C2, . . . , CK may also make it possible to identify a particular geolocation server (in the case where a plurality of geolocation servers 50 would be available, a reliability value may be associated with a particular geolocation server) or to characterise said geolocation server 50 (type or cost of proposed service, for example). For each identifier ID, the identifier reliability database 33 also stores a reliability value (a score) associated with said identifier. When a plurality of transmitting devices are detected by the terminal 20 and given as information in the message transmitted to the access network 30, a line may contain a plurality of identifiers and the associated scores. The way in which the scores are calculated will be detailed later.

When a message is received coming from a terminal 20 of which it is sought to estimate the geographical position, discrimination information may be determined based on said message. The discrimination information may correspond to a particular feature determined for the received message, or to a combination of particular features determined for the received message.

For example, if an identifier ID of value A (ID=A) is contained in the message, and if the access network 30 is capable of determining that the terminal 20 belongs to the customer company B (C1=B), and that the terminal is located in the country C (C2=C), then it is possible to make a request to the identifier reliability database 33 to obtain the various scores for which the conditions (ID=A), (C1=B), and (C2=C) and to determine a reliability value for the identifier A based on the scores obtained.

According to another example, a feature (for example C3) may correspond to coordinates of an approximate geographical position of the terminal 20 determined by the access network 30 (C3=D). In this case, it is possible to make a request to the identifier reliability database 33 to obtain the various scores for which on the one hand the condition (ID=A) is satisfactory and on the other hand the position indicated for the feature C3 belongs to a geographical region centred on C and having a certain diameter.

Thus, it is possible to develop various strategies to determine, in step 103, a reliability value for an identifier of a transmitting device 40 detected by the terminal 20. The choice of one particular strategy does not, however, constitute only one variant of the invention.

Interest should now be paid to the way in which the identifier reliability database 33 may be constructed and kept up to date.

Figure 7:
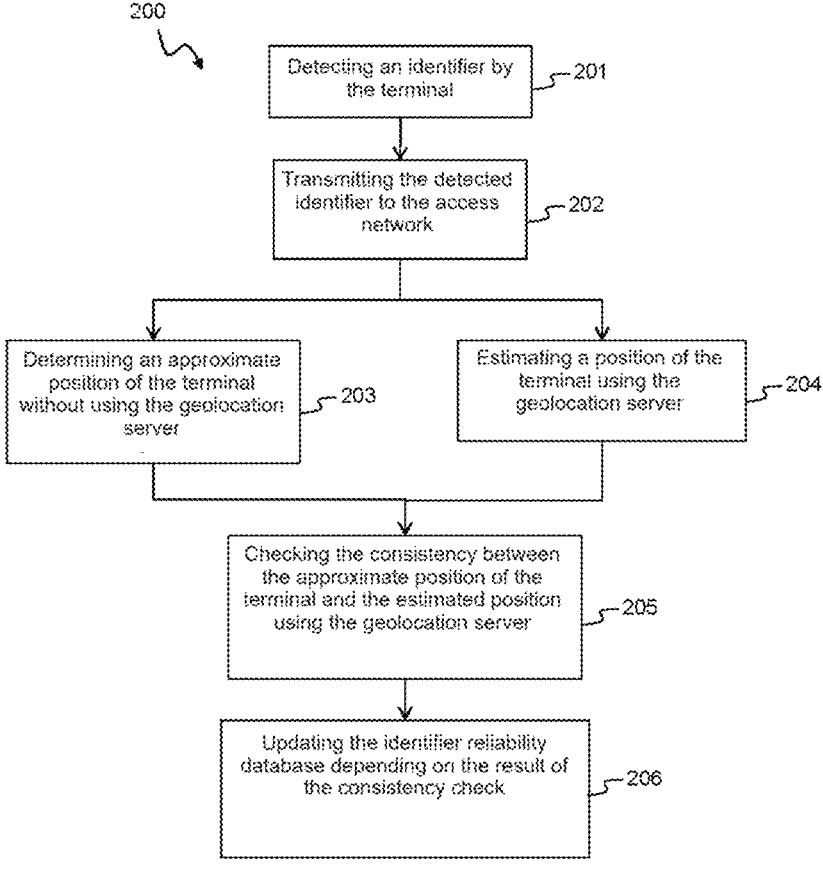

FIG. 7 schematically shows the main steps of one example of implementation of a method 200 for updating the identifier reliability database 33 (or for creating the identifier reliability database 33 if this does not yet exist).

The update method 200 includes a step of detecting 201, by a terminal 20 of the wireless communication system 10, for at least one transmitting device 40, the identifier of said transmitting device 40. The identifier of the transmitting device 40 is detected based on a message transmitted by the transmitting device 40 according to the second wireless communication protocol. It should be noted that this may concern the same terminal 20 or a terminal 20 other than that mentioned above in the description of the geolocation method 100. In addition, this may concern the same transmitting device 40 or a transmitting device 40 other than those mentioned in the description of the geolocation method 100. This step 201 is similar to step 101 described above with reference to FIG. 3.

The update method 200 subsequently includes a step of transmitting 202, by the terminal 20, to the access network 30, a message including said identifier. This message is transmitted by the terminal 20 according to the first wireless communication protocol. This step 202 is similar to step 102 described above with reference to FIG. 3.

Figure 4:
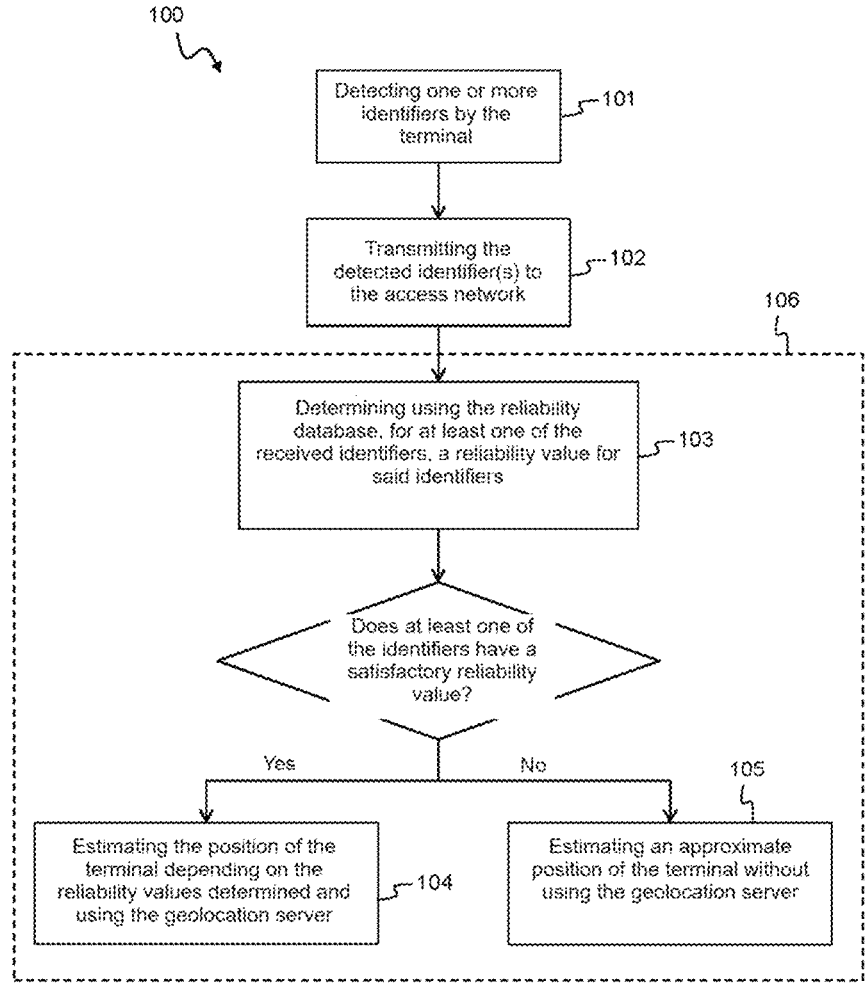
Figure 5:
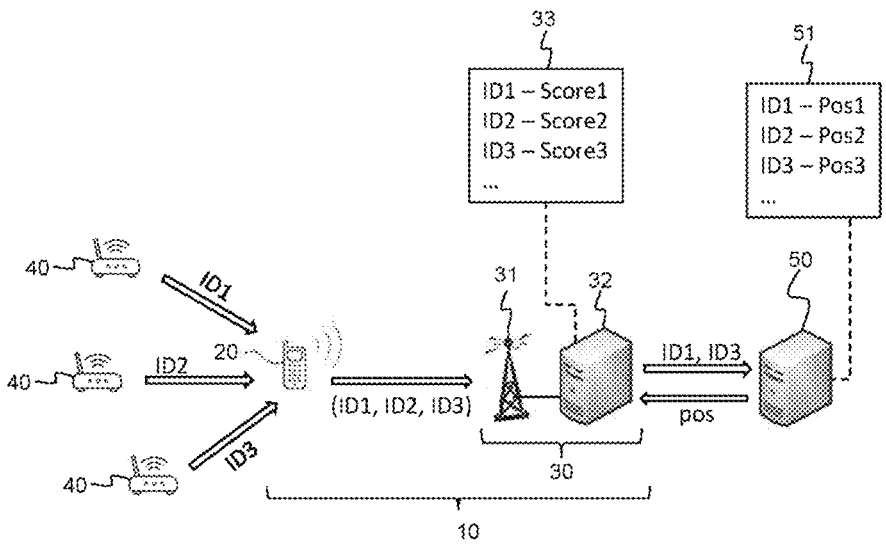
FIG. 5 illustrates a first example according to which the identifier reliability database 33 simply stores a score attributed to each identifier.

The update method 200 includes a step of determining 203, without using the geolocation server 50, an approximate geographical position of the terminal 20. This step is similar to step 105 described above with reference to FIG. 4. The various methods proposed above in the description of step 105 for determining an approximate geographical position of the terminal 20 are also valid for this step 203.

The update method 200 includes a step of estimating 204 a geographical position of the terminal 20, using the geolocation server 50, and based on the received identifier. In this step, the reliability value associated with the identifier in the identifier reliability database 33 is not necessarily taken into account.

The update method 200 subsequently includes a step of checking the consistency 205, between the approximate geographical position of the terminal 20 (determined in step 203) and the geographical position of the terminal 20 estimated (in step 204) using the geolocation server 50.

Finally, the update method 200 includes a step of updating 206 the identifier reliability database 33 for said identifier depending on the result of the consistency check 205.

In the example considered, steps 203, 204, 205 and 206 are implemented by the server 32 of the access network 30. However, it should be noted that, in one variant, nothing would prevent all or some of these steps from being implemented by a third-party server that hosts the identifier reliability database (however, this is still the case where the server(s) that store(s) the identifier reliability database are different from the geolocation server 50).

The consistency check step 205 may include, for the received identifier, calculating a distance between the approximate geographical position of the terminal 20 (determined in step 203) and the geographical position associated with the identifier in the geolocation database 51 (this position generally corresponds to the position of the terminal 20 estimated in step 204, particularly when only one identifier is considered). For example, if it is noted $P_1$ the approximate geographical position of the terminal 20; $R_1$ a value representative of a level of accuracy of the estimation of this geographical position $P_1$ (radius about $P_1$ wherein the terminal is presumed present with a certain level of probability, for example 90%); $P_2$ the geographical position associated with the identifier in the geolocation database 51; $R_2$ the value representative of the level of accuracy of this geographical position $P_2$; dist $(P_1, P_2)$ the distance between $P_1$ and $P_2$; then it is possible to determine the result of the consistency check 205 depending on the following expression:

$$dist(P_1, P_2) \le f(R_1, R_2) \qquad \text{[Math. 1]}$$

If this expression is false, then there is an inconsistency between the approximate geographical position of the terminal 20 (determined in step 203) and the geographical position associated with the identifier in the geolocation database 51. On the other hand, if this expression is true, then the approximate geographical position of the terminal 20 determined in step 203 is consistent with the geographical position associated with the identifier in the geolocation database 51. By way of non-limiting example, the function f may thus be defined (the result of the dist and f functions are for example values in metres):

$$f(R_1, R_2) = 3 \times (R_1 + R_2) + 500 \qquad \text{[Math. 2]}$$

When the geographical position is contextual information (and not coordinates), the contextual information representative of the geographical position of the terminal 20 determined in step 203 may be compared with the contextual information associated with the identifier of the transmitting device 40 in the geolocation database 51. This comparison may possibly be implemented using a reverse geocoding type application.

When a plurality of different identifiers of transmitting devices 40 detected by the terminal 20 are received by the access network 30 in the same message (or in a plurality of messages transmitted at similar moments), the geographical position of the terminal 20 can be estimated in step 204 based on the set of received identifiers. For the one at least of the received identifiers, known as "identifier of interest", the consistency check 205 may comprise the following steps of:

a first consistency check between the geographical position of the terminal 20 estimated in step 204 using the geolocation server 50 and the approximate geographical position of the terminal 20 determined in step 203, if the first consistency check indicates an inconsistency, a second consistency check between the geographical position associated in the geolocation database 51 with the identifier of interest and the approximate geographical position of the terminal 20.

In other words, the approximate geographical position of the terminal 20 is compared initially with one or more tuples of geographical positions determined for one or more tuples of identifiers constructed based on the received identifiers. A first consistency check is then performed between the approximate geographical position of the terminal 20 (determined in step 203 without the geolocation server 50) and the geographical position(s) determined with the geolocation server 50 based on said tuples of identifiers. If an inconsistency is noted, a second consistency check may be carried out for each identifier of the tuple considered. It should be noted that additional information may be used to weight the various identifiers constituting a tuple. This additional information may correspond, for example, to power levels at which the various messages including the identifiers have been received by the terminal 20 coming from the various transmitting devices 40 detected.

Such provisions may particularly make it possible to reduce the number of requests transmitted to the geolocation server 50 (a single request including a plurality of identifiers is initially transmitted to the geolocation server 50, and individual requests relating to a single identifier are only transmitted if an inconsistency is observed).

When an inconsistency is observed for an identifier, this means that the identifier is not reliable, or at least that the identifier is not very reliable, and this information should be given in the identifier reliability database 33.

For this purpose, if the identifier reliability database 33 only stores the identifiers that are considered reliable, said identifier should be deleted from the identifier reliability database 33.

According to another example, if the identifier reliability database 33 only stores the identifiers that are considered unreliable, said identifier should be added to the identifier reliability database 33.

According to yet another example, if the identifier reliability database 33 associates a reliability value between zero and one with each identifier that it stores (a value close to one indicating a good reliability), then the update step 206 may include calculating a new reliability value for this identifier. The new reliability value may particularly be calculated depending on the distance between the approximate geographical position of the terminal 20 and the geographical position associated with said identifier in the geolocation database 51.

For example, by taking the scores used hereinabove for the formulae [Math 1.] and [Math. 2], the new reliability value SN may thus be calculated (a being a normalising factor):

$$S_N = \exp\left(-\alpha\left(\frac{dist(P_1, P_2)}{3 \times (R_1 + R_2)}\right)\right) \qquad \text{[Math. 3]}$$

In particular implementations, the new reliability value is further calculated depending on a reliability value Sp previously attributed to said identifier in the identifier reliability database 33.

In particular implementations, the identifier reliability database 33 includes, for each identifier, a last update date of the reliability value. The new reliability value SN may then be calculated depending on a current date $T_N$ and depending on the last update date $T_P$ of the reliability value of said identifier ($\gamma$ is a normalising factor):

$$\beta = \exp(-\gamma \times |T_N - T_P|) \qquad \text{[Math. 4]}$$

$$S_N = \beta \times S_P + (1 - \beta)\exp\left(-\alpha\left(\frac{dist(P_1, P_2)}{3 \times (R_1 + R_2)}\right)\right)$$

As already indicated above, it is also possible to update, in the identifier reliability database 33, for said identifier, an approximate geographical position of the transmitting device 40 carrying said identifier (the latter being determined without using the geolocation server 50).

The update method 200 has been described hereinabove in a scenario where the consistency check step 205 and the update step 206 are implemented in response to receiving a message transmitted by a terminal 20. However, it should be noted that the update method 200 is not necessarily implemented message by message. The server that implements the update method 200 may particularly be configured to collect a plurality of messages before implementing the consistency check 205 and update 206 steps. Indeed, it may be complicated and expensive to update a database continuously, and it may be more advantageous to group checks and/or corrections to be made to the database.

In other words, the consistency check step 205 and the update step 206 (and possibly also the step of determining 203 an approximate geographical position of the terminal 20 without using the geolocation server 50 and/or the step of estimating 204 a geographical position of the terminal 20 using the geolocation server 50) may be delayed until a predetermined criterion is met. This criterion may particularly correspond to the expiry of a waiting time, due to the fact that a certain number of messages including an identifier of a transmitting device has been received, or due to the fact that a certain number of identifiers of transmitting devices has been received. However, other criteria could be envisaged to delay, and therefore group, the implementation of these steps for a plurality of different identifiers of transmitting devices. It is also possible to delay the update step 206 in relation to the consistency check step 205.

It should be noted that, when a plurality of geolocation servers 50 are available, it is possible to query the various geolocation servers 50 in order to update the identifier reliability database. In particular, it is possible to define, for the same identifier, a plurality of different reliability values, each reliability value being associated with a particular geolocation server 50 (each reliability value being able to be calculated depending on the result of a consistency check 205 carried out for the associated geolocation server 50). According to another example, it is possible to define, for a given identifier, a reliability value calculated depending on the results of a plurality of consistency checks 205 carried out with a plurality of geolocation servers 50 (for example the reliability value may correspond to an average of a plurality of reliability values calculated individually for each geolocation server 50).

In particular implementations, it is further possible to transmit to one or more terminals 20 of the wireless communication system 10 a message including a list of identifiers selected depending on reliability values that are associated with them in the identifier reliability database 33. It is for example possible to communicate to the terminals a list of identifiers that are considered unreliable, to prevent the terminals from unnecessarily sending these identifiers in the messages that they address to the access network 30. According to another example, it is possible to communicate to the terminals a list of identifiers that are considered reliable, to encourage the terminals to send these identifiers in the messages that they address to the access network 30.

It should be noted that the method for updating 200 the identifier reliability database 33 is not generally implemented for each message received from a terminal 20. However, the identifier reliability database must be regularly updated because an erroneous geographical position of a transmitting device 40 in the geolocation database 51 can be corrected at the end of a certain amount of time. Therefore, when an identifier is considered not very reliable in the identifier reliability database 33, the method for updating 200 the reliability database 33 for this identifier should be implemented regularly.

Any type of interface may be envisaged between the server 32 of the access network 30 and the geolocation server 50 and between the server 32 and the server hosting the identifier reliability database (when the identifier reliability database is hosted by a server different from the server 32). In particular, it is possible to envisage the use of a file, of a program interface, of a reminder function, etc.

Figure 3:
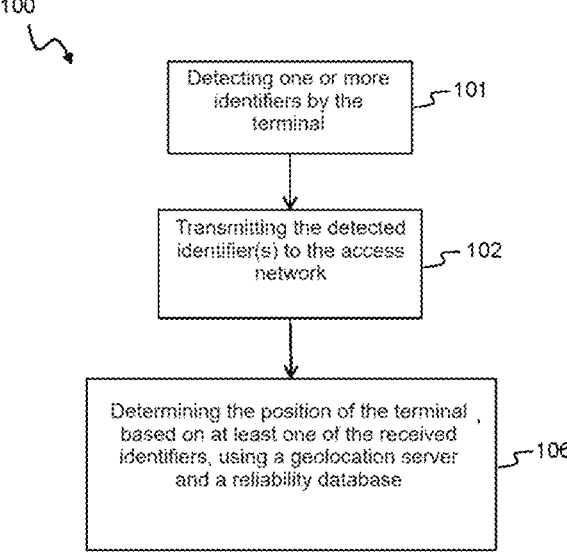
Figure 8:
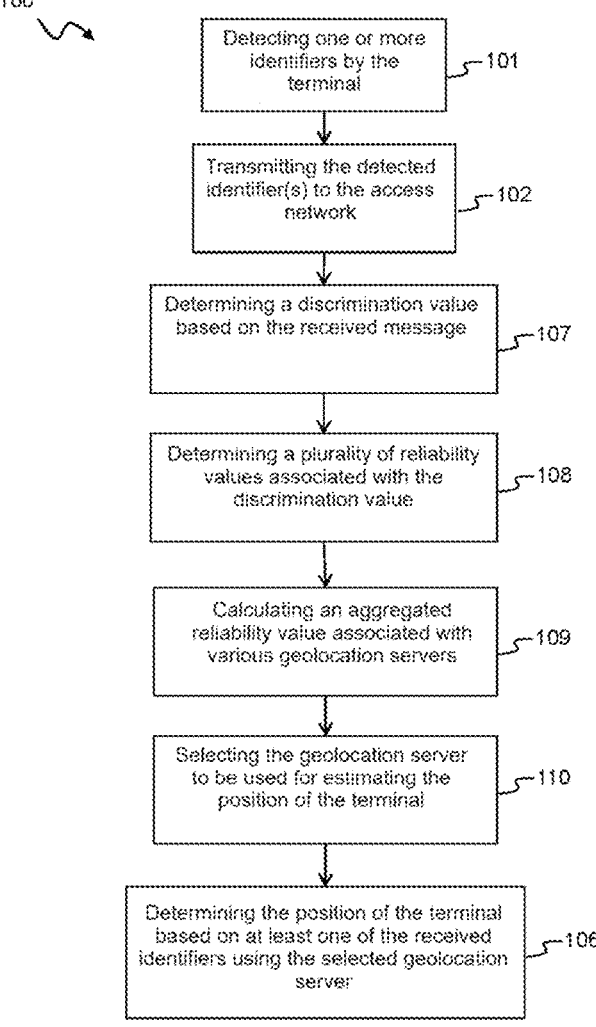

FIG. 8 shows by way of example another particular implementation of the geolocation method 100 described hereinabove with reference to FIG. 3. For this particular implementation, it is considered that a plurality of different geolocation servers 50 are available for geolocating the terminal 20. In the identifier reliability database, an identifier is associated with a plurality of reliability values and each reliability value is associated with a particular geolocation server. Furthermore, each reliability value is associated with a particular value of discrimination information.

The particular implementation described in FIG. 8 makes it possible to select the geolocation server 50 that seems the most reliable for geolocating the terminal from the various available geolocation servers 50.

In this particular implementation, the method 100 includes determining 107 a value of the discrimination information, by the access network 30, based on a message received from the terminal 20 (said message including at least one portion of an identifier of a transmitting device 40 detected by the terminal 20).

For example, the discrimination information may correspond to an approximate geographical position of the terminal 20 when it transmits the message (where at a geographical area in which it is estimated that the terminal 20 is located when it transmits the message). The approximate position of the terminal 20 may be estimated by the access network 30 according to various methods already described above. According to another example, the discrimination information may correspond to a customer company name to which the terminal 20 belongs, a type of equipment corresponding to the terminal 20, etc.

The method 100 subsequently includes determining 108 a plurality of reliability values associated with said discrimination information value in the identifier reliability database 33. It should be noted that these reliability values are not necessarily associated with identifiers corresponding to the identifier (or to the identifiers) detected and given as information by the terminal 20.

The method 100 subsequently includes calculating 109 an aggregated reliability value, for each of the available geolocation servers 50, based on the reliability values thus determined. The aggregated value may be calculated according to various methods (average, median, quantile or other). An aggregated value may be calculated by taking into account the set of identifiers meeting the discrimination value, or only a sub-set of identifiers meeting the discrimination value. It is particularly possible to only take into account the identifiers that meet the discrimination value for all of the geolocation servers considered.

The method 100 subsequently includes selecting 110 the geolocation server 50 to be used for estimating 104 the geographical position of the terminal 20 depending on the calculated aggregated values (for example, the geolocation server 50 having the best calculated aggregated value is selected).

The geographical position of the terminal 20 is finally determined, in step 106, based on at least one of the received identifiers, using the selected geolocation server.

With this particular implementation, it becomes possible to select the geolocation server 50 that seems the most reliable for geolocating the terminal 20 even in the case where the identifier (or the identifiers) detected by the terminal 20 and transmitted to the access network 30 are not present in the identifier reliability database 33.

It should be noted that other criteria may be taken into account for calculating an aggregated value. It is possible, for example, to take into account a service cost associated with a geolocation server 50, in order to favour the least expensive geolocation servers 50. According to another example, it is possible to take into account the number of identifiers in the reliability database 33 that meet the discrimination value. According to another example, it is possible, during the calculation of an aggregated value, to weight the reliability value of an identifier depending on the last update date of said reliability value (in order to give greater importance to the reliability values that have recently been updated). It is also possible to weight an aggregated value calculated for a geolocation server 50 depending on an average date of the last update of the reliability values of the identifiers used for calculating the aggregated value (in order to favour the geolocation servers 50 for which the most recent information has been obtained).

It should be noted that, for a given piece of discrimination information, an aggregated value may be calculated either directly when it is sought to determine the position of the terminal 20 (that is to say when the access network 30 receives one or more messages from the terminal 20 including one or more identifiers of transmitting devices 40), or at another time, depending on particular criteria (for example, an aggregated value may be periodically updated, or after a certain number of messages have been received, etc.). In particular, when the discrimination information is a geographical area wherein the terminal 20 is located, this geographical area may be defined depending on the estimated approximate position of the terminal 20, when the access network 30 receives one or more messages from the terminal 20. This geographical area may, however, also be identified, depending on the estimated approximate position of the terminal 20, from a plurality of geographical areas corresponding to a predetermined division of a geographical space to be covered (in this case, an aggregated value may be previously calculated for each geographical area of the division at a time that is irrespective of receiving a message coming from the terminal 20).

The step of determining 106 the geographical position of the terminal 20 may be implemented in various ways, and particularly as described above with reference to FIG. 4. In particular, and as described in FIG. 9, once the geolocation server 50 has been selected, it is possible to select one or more identifiers from the received identifiers of the terminal 20, depending on the reliability values of said identifiers for the selected geolocation server 50. The geographical position of the terminal 20 may then be estimated, in step 104, based on the selected identifiers, and using the selected geolocation server 50.

The description provided hereinabove clearly shows that, via its different features and the advantages thereof, the present invention achieves the objectives set. In particular, the invention makes it possible to increase reliability of the geolocation of a terminal based on one or more identifiers of neighbouring transmitting devices. This increasing reliability of the geolocation of the terminal is particularly implemented by selecting the geolocation server 50 to be used and/or selecting the identifiers to be used, thanks to the use of a database giving information about the reliability of an identifier relative to a geolocation server 50.

The invention claimed is:

1. A geolocation method for geolocating a terminal of a wireless communication system, said terminal being adapted to exchange messages with an access network of said wireless communication system according to a first wireless communication protocol, said method including:

detecting, by the terminal, for at least one transmitting device, an identifier of said transmitting device based on a message transmitted by said transmitting device according to a second wireless communication protocol, transmitting, by the terminal, to the access network, according to the first wireless communication protocol, at least one message including one or more detected identifiers, determining, by the access network, a geographical position of the terminal by transmitting a request comprising at least one of the received identifiers to a geolocation server storing a geolocation database including a list of identifiers of transmitting devices and the respective geographical positions of said transmitting devices, said request being defined using a database, known as "identifier reliability database", making it possible to associate with any identifier at least one value representative of the reliability of said identifier for said geolocation server; the identifier reliability database being used for at least one of selecting the geolocation server to which to send the request and selecting the identifiers to be included in the request; the identifier reliability database being stored by one or more servers different from the geolocation server.

2. The geolocation method according to claim 1, wherein determining the geographical position of the terminal includes:

determining, by the access network, using the identifier reliability database, for at least one of the received identifiers, a reliability value for said identifier, when said at least one of the received identifiers has a satisfactory reliability value, estimating a geographical position of the terminal based on said identifier with the geolocation server.

3. The geolocation method according to claim 2, wherein the reliability value of each identifier from the received identifiers is compared with a threshold value to determine whether or not the identifier must be used for estimating the geographical position of the terminal using the geolocation server.

4. The geolocation method according to claim 2, further including, when none of the received identifiers has a satisfactory reliability value, estimating an approximate geographical position of the terminal without using the geolocation server.

5. The geolocation method according to claim 4, wherein the identifier reliability database includes, for said at least one of the received identifiers, an approximate geographical position of the transmitting device carrying said identifier, said approximate geographical position having been previously determined without using the geolocation server, and the estimation of the approximate geographical position of the terminal is carried out depending on the approximate geographical position associated with said identifier.

6. The geolocation method according to claim 2, wherein said at least one of the received identifiers is associated, in the identifier reliability database, with a plurality of reliability values each associated with a different value of discrimination information.

7. The geolocation method according to claim 6, wherein a value of the discrimination information is determined by the access network based on said at least one message received from the terminal, and the geolocation method includes, for said at least one of the received identifiers, obtaining a reliability value to be taken into account for estimating the geographical position of the terminal based on said value of the discrimination information.

8. The geolocation method according to claim 6, wherein the discrimination information makes it possible to identify a geolocation server, and the geolocation method includes selecting the geolocation server to be used for estimating the geographical position of the terminal depending on the various reliability values of said at least one of the received identifiers.

9. The geolocation method according to claim 1, wherein any identifier may be associated, in the identifier reliability database, with a plurality of reliability values each associated with a different value of discrimination information, and the geolocation method includes:
- determining, by the access network, a value of the discrimination information based on said at least one message received from the terminal-,
- determining a plurality of reliability values associated with said discrimination information value in the identifier reliability database,
- calculating an aggregated reliability value, for each one of a plurality of geolocation servers, based on the reliability values thus determined,
- selecting the geolocation server to be used for estimating the geographical position of the terminal depending on the calculated aggregated values.

10. An update method for updating an identifier reliability database such as defined in claim 1, said method including:
- detecting, by a terminal, for at least one transmitting device, an identifier of said transmitting device based on a message transmitted by said transmitting device according to the second wireless communication protocol,
- transmitting, by the terminal, to the access network, according to the first wireless communication protocol, a message including said identifier,
- estimating a geographical position of the terminal using a geolocation server based on said identifier,
- determining, without using the geolocation server, an approximate geographical position of the terminal,
- performing a consistency check between the approximate geographical position of the terminal and the estimated geographical position of the terminal using the geolocation server,

- updating the identifier reliability database for said identifier depending on the result of the consistency check.

11. The update method according to claim 10, wherein the consistency check includes calculating a distance between the approximate geographical position of the terminal and the geographical position associated with said identifier in the geolocation database.

12. The update method according to claim 10, wherein the update includes calculating a new reliability value depending on a distance between the approximate geographical position of the terminal and the geographical position associated with said identifier in the geolocation database.

13. The update method according to claim 12, wherein the new reliability value is further calculated depending on a reliability value previously attributed to said identifier in the identifier reliability database.

14. The update method according to claim 13, wherein the identifier reliability database includes, for said identifier, a last update date of the reliability value, and the new reliability value is further calculated depending on the current date and on the last update date of the reliability value of said identifier.

15. Server A server of an access network of a wireless communication system, said system including at least one terminal adapted to exchange messages with the access network according to a first wireless communication protocol and to receive a message transmitted by a transmitting device according to a second wireless communication protocol, said server being configured to:
- receive from the terminal at least one message including at least one identifier of a transmitting device detected by said terminal,
- determine a geographical position of the terminal by transmitting a request comprising at least one of the received identifiers to a geolocation server storing a geolocation database including a list of identifiers of transmitting devices and the respective geographical positions of said transmitting devices, said request being defined using a database, known as "identifier reliability database", making it possible to associate with any identifier at least one value representative of the reliability of said identifier for said geolocation server; the identifier reliability database being used for at least one of selecting the geolocation server to which to send the request and/or selecting the identifiers to be included in the request; the identifier reliability database being stored by one or more servers different from the geolocation server.

16. The server according to claim 15, wherein the server is configured to:
- determine, for at least one of the received identifiers, a reliability value using the identifier reliability database,
- when at least one of the received identifiers has a satisfactory reliability value, estimate a geographical position of the terminal based on said identifier with the geolocation server.

17. The server according to claim 16, wherein said at least one of the received identifiers is associated, in the identifier reliability database, with a plurality of reliability values each associated with a different value of discrimination information making it possible to identify a geolocation server, and said server is further configured to select, depending on the various reliability values associated with said identifier, the geolocation server to be used for estimating the geographical position of the terminal.

18. The server according to claim 15, wherein any identifier may be associated, in the identifier reliability database, with a plurality of reliability values each associated with a different value of discrimination information, and the server is configured to:

determine a value of the discrimination information based on said at least one message received from the terminal, determine a plurality of reliability values associated with said discrimination information value in the identifier reliability database, calculate an aggregated reliability value, for each one of a plurality of geolocation servers, based on the reliability values thus determined, select the geolocation server to be used for estimating the geographical position of the terminal depending on the calculated aggregated values.

19. The server according to claim 15, said server further being configured to:

determine an approximate geographical position of the terminal without using the geolocation server, perform a consistency check between the approximate geographical position of the terminal and the estimated geographical position of the terminal using the geolocation server, update the identifier reliability database for at least one of the received identifiers depending on the result of the consistency check.

20. The server according to claim 19, said server further being configured to calculate, for at least one of the received identifiers, a new reliability value depending on a distance between the approximate geographical position of the terminal and the geographical position associated with said identifier in the geolocation database.

21. Access network including a server according to claim 19.

\* \* \* \* \*